Patented Aug. 6, 1935

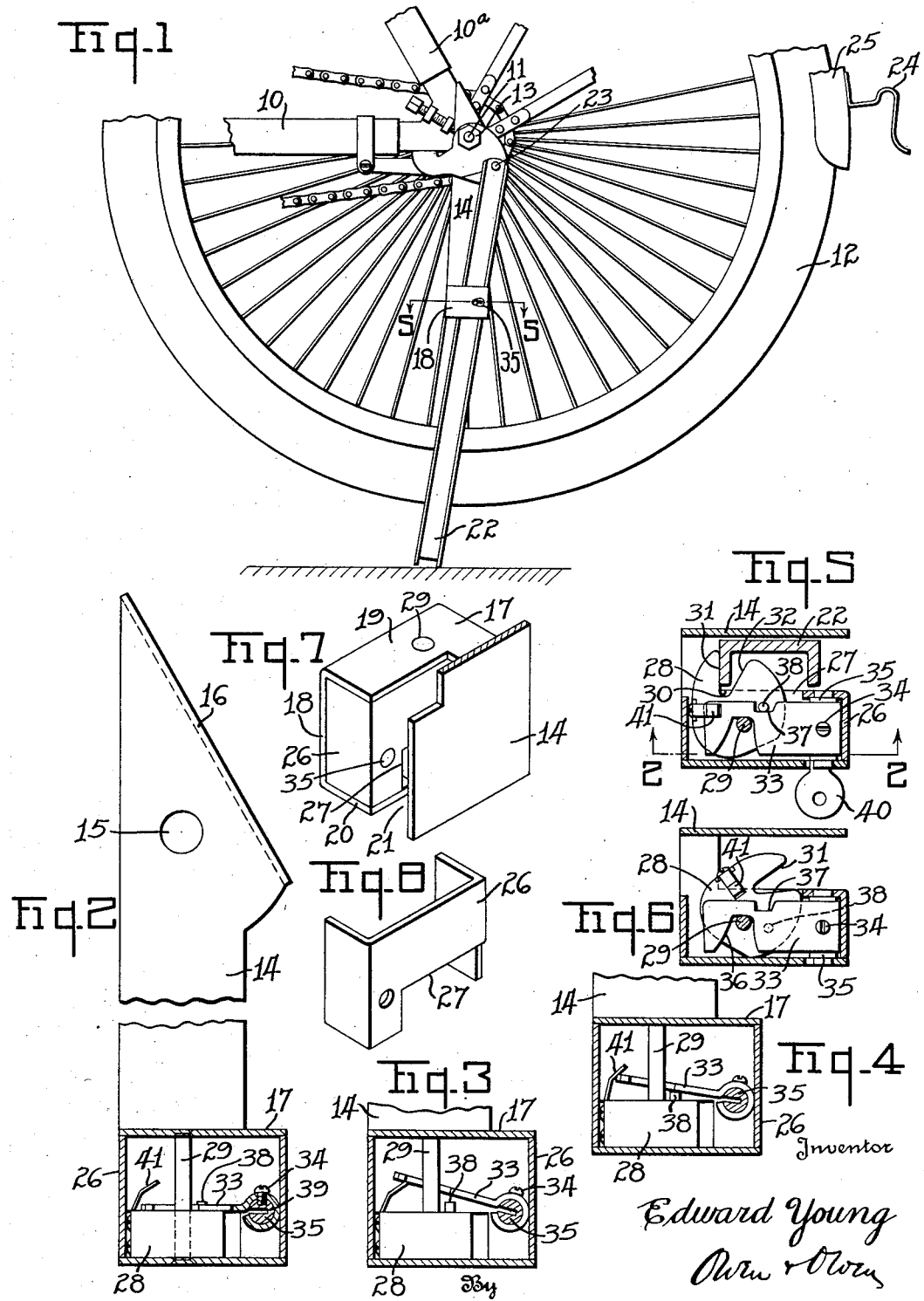

2,010,707

UNITED STATES PATENT OFFICE 2,010,707

BICYCLE STAND LOCK

Edward Young, Toledo, Ohio

Application January 17, 1935, Serial No. 2,238

3 Claims. (Cl. 70—90)

This invention relates to bicycles, motorcycles, but more particularly to locking the stand supporting the rear wheel off the ground, so that the stand cannot be swung to inoperative position by an unauthorized person, and an object is to produce a simple and efficient device of this character which will be effective in securely locking the stand in position of use and render virtually impossible release of the stand with out the proper key for the lock, and which has the novel features of construction, arrangement and operation hereinafter described.

For purposes of illustration, the invention is shown on the accompanying drawing, in which:

Figure 1 is a fragmentary side elevation of a rear bicycle wheel and a portion of the frame, the stand being shown in full lines in operative position;

Figure 2 is a sectional elevation on the line 2—2 of Figure 5 showing the position of the parts in locked position;

Figure 3 is a view of the housing portion shown in Figure 2 showing the locking plate lifted to release the dog from locking position;

Figure 4 is a view similar to Figure 3 showing the locking plate in the position it assumes during the movement of the dog from normal position to locking position;

Figure 5 is a transverse section on the line 5—5 of Figure 1 showing the stand in locked position;

Figure 6 is a view similar to Figure 5 showing the dog in released position;

Figure 7 is an enlarged sectional view in perspective of the housing end of the bracket; and Figure 8 is a perspective view of the housing insert.

The illustrated embodiment of the invention comprises a bicycle frame 10 having an upward and forwardly inclined part 10ª, and secured to the frame is an axle 11 for the wheel 12. On opposite ends of the axle are nuts 13, and mounted on the axle 11 is a bracket arm 14 which is apertured at 15 to fit over the axle and lie close against the frame. Integral with the arm 14 and inclined upwardly and forwardly is a flange 16 which abuts the frame part 10ª for holding the bracket against swinging movements.

A bracket arm 14 extends downwardly, and formed on the lower end thereof is a housing 17 which is spaced laterally from the arm 14 and consists of a side wall 18 and top and bottom walls 19 and 20 respectively. The top and bottom walls 19 and 20 are spaced from the bracket arm 14 to provide a recess 21 to admit or receive the U-shaped standard 22, which is pivotally mounted at its upper end at 23 to the frame part. It will be understood that the standard 22 is swung to the full line position shown in Figure 1 to support the bicycle wheel 12 free from the ground. When not in use the standard is swung upwardly and retained in that position by a spring clip 24, which is secured to a mudguard 25.

Fitting in the housing 17 and held in place in any suitable manner, as by friction, is a U-shaped part 26, which closes the front and one side of the housing. The piece 26 is formed with a cut-out portion 27 through which extends a rotatable dog 28, which is pivotally mounted in the housing on a pin 29. The dog 28 is provided with a V-shaped notch 30 providing abutment surfaces 31 and 32. Normally, the dog 28 is disposed in the position indicated in Figure 6, the abutment surface 31 being exposed to the standard 22, which turns or swings the dog in a counterclockwise direction into the position shown in Figure 5.

For locking the dog 28 in the position shown in Figure 5, a plate 33 is secured by a screw 34 to a lock part 35, which is pivotally mounted in the housing to swing on an axis at right angles to the axis of the dog 28. The locking plate 33 is notched at one edge at 36 to receive the pin or rivet 29, a shallower notch 37 being formed at the opposite edge of the plate to receive a pin 38 projecting upwardly a short distance from the dog 28. When the dog 28 is swung to the position indicated in Figure 5 with the standard disposed within the recess, the locking plate 33 drops into position so that the pin 38 is disposed in a notch 37, thereby blocking clockwise movement of the dog 28.

The lock part 35 is provided with a groove to receive a key 40, by which the locking plate 33 may be swung upwardly to release the dog 28 and enable the standard 22 to be swung away from operative position. Riveted to a side edge of the dog 28 is a leaf spring 41, which inclines upwardly and inwardly toward the axis of the locking plate. The spring 41 is disposed at a point diametrically opposed to the locking plate axis when the dog is in locking position.

When it is desired to release the standard 22 from locking engagement with the dog 28, the key 40 is inserted in the groove 39 of the locking part 35 and turned in a clockwise direction, the spring 41 yielding to allow the locking plate to pass it. The standard 22 can then be released, it contacting the abutment surface 32 of the dog 28, moving the latter in a clockwise direction during its retrograde movement. It will be apparent that the locking plate 33 is lifted away from the pin 38 so that the dog is thus free to turn. After the spring has moved away from the locking plate 33, the latter drops against the pin 38 where it remains until the dog 28 is again moved to locking position. The spring 41 is so formed that during such movement the end of the locking plate 33 may move beneath the upwardly inclined outer end of the spring 41. It will be noted that the standard 22 is U-shaped in cross-section, one leg of the U portion serving to actuate the dog 28 to and from locking position.

It is to be understood that numerous changes in details of construction, arrangement and operation may be effected without departing from the spirit of the invention, especially as defined in the appended claims.

What I claim as new and desire to secure by Letters Patent is:

1. An attachment for a bicycle having a frame part, a wheel axle, and a pivotally mounted stand for supporting the wheel, said attachment comprising a bracket mounted on the axle and extending outwardly therefrom, a housing on said bracket to receive the stand, a flange on one end of said bracket engageable with the frame part for preventing turning movements of the bracket, a dog in the housing engageable by the stand to move same to locking position, a locking plate for blocking movement of the dog from locking position, manually operable means to move said plate to release said dog, a spring on said dog to hold said plate out of operative engagement with said dog, said spring being arranged to release said plate when said dog has reached locking position, and means on said dog engageable by the stand for returning the dog to normal position when the stand is swung away from operative position.

2. An attachment for a bicycle having a frame part, a wheel axle, and a pivotally mounted stand for supporting the wheel, said attachment comprising a bracket mounted on the axle and extending outwardly therefrom, a housing on said bracket to receive the stand, a pivoted dog in the housing engageable by the stand to move same to locking position, a pin on said dog, a locking plate engageable with said pin for blocking movement of said dog from locking position, key-operated means for actuating said plate to release said dog, and a leaf spring movable with said dog for holding said plate away from said dog, said spring being movable to release said plate when said dog has been moved to dogging position.

3. A device of the class described comprising a housing, a pivotally mounted dog in said housing movable to and from locking position, a pin on said dog, a locking plate engageable with said pin for blocking movement of the dog from locking position, key operated means for actuating said plate to release said dog, and resilient means movable with said dog for holding said plate away from said dog, said resilient means being adapted to release said plate when said dog has been moved to dogging position.

EDWARD YOUNG.